Apr. 17, 1923.  
E. H. BELDEN  
TRACTOR  
Filed Oct. 9, 1919  
1,452,262  
12 sheets-sheet 4
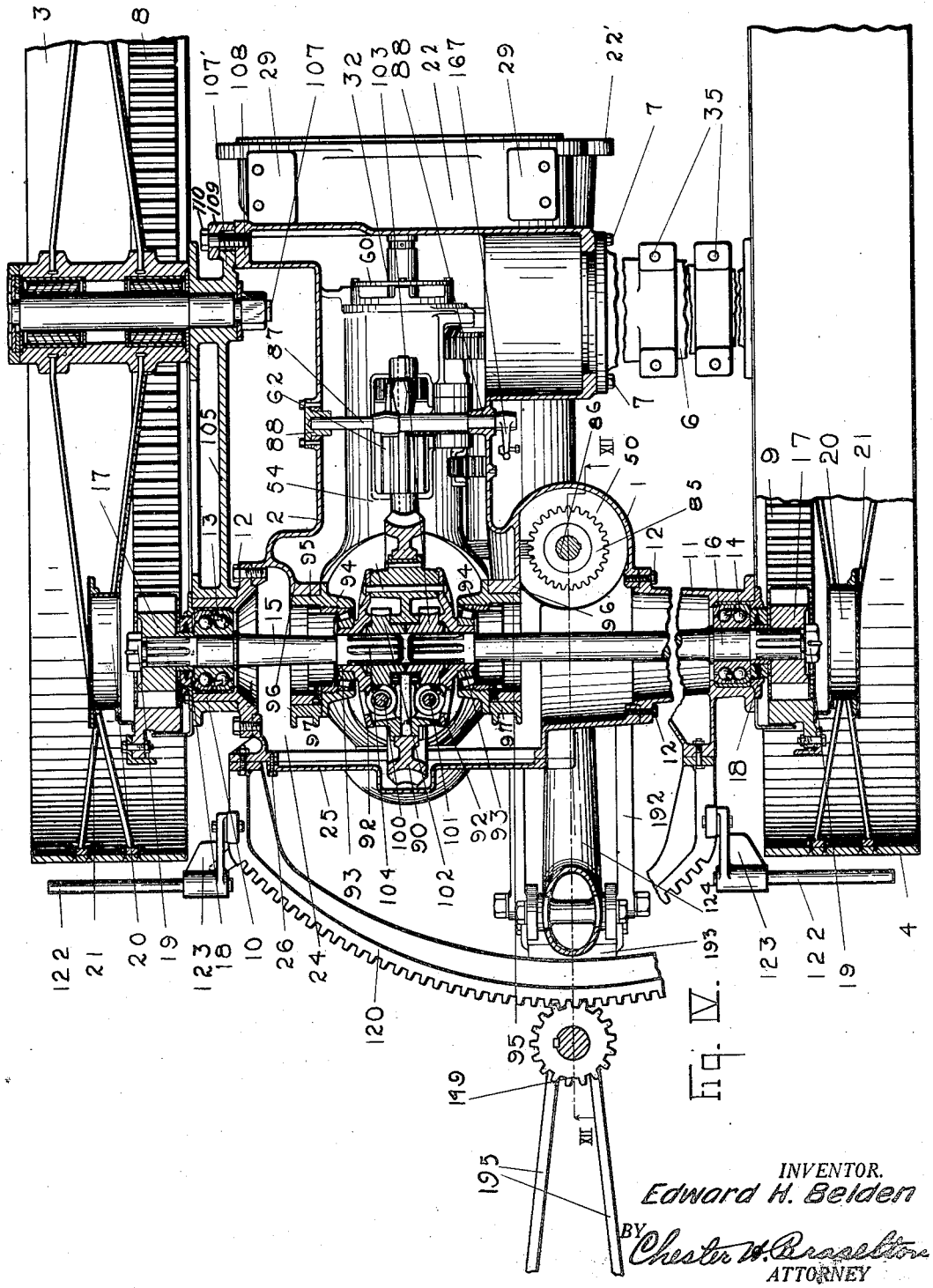
INVENTOR.  
*Edward H. Belden*  
BY *Chester W. Braselton*  
ATTORNEY

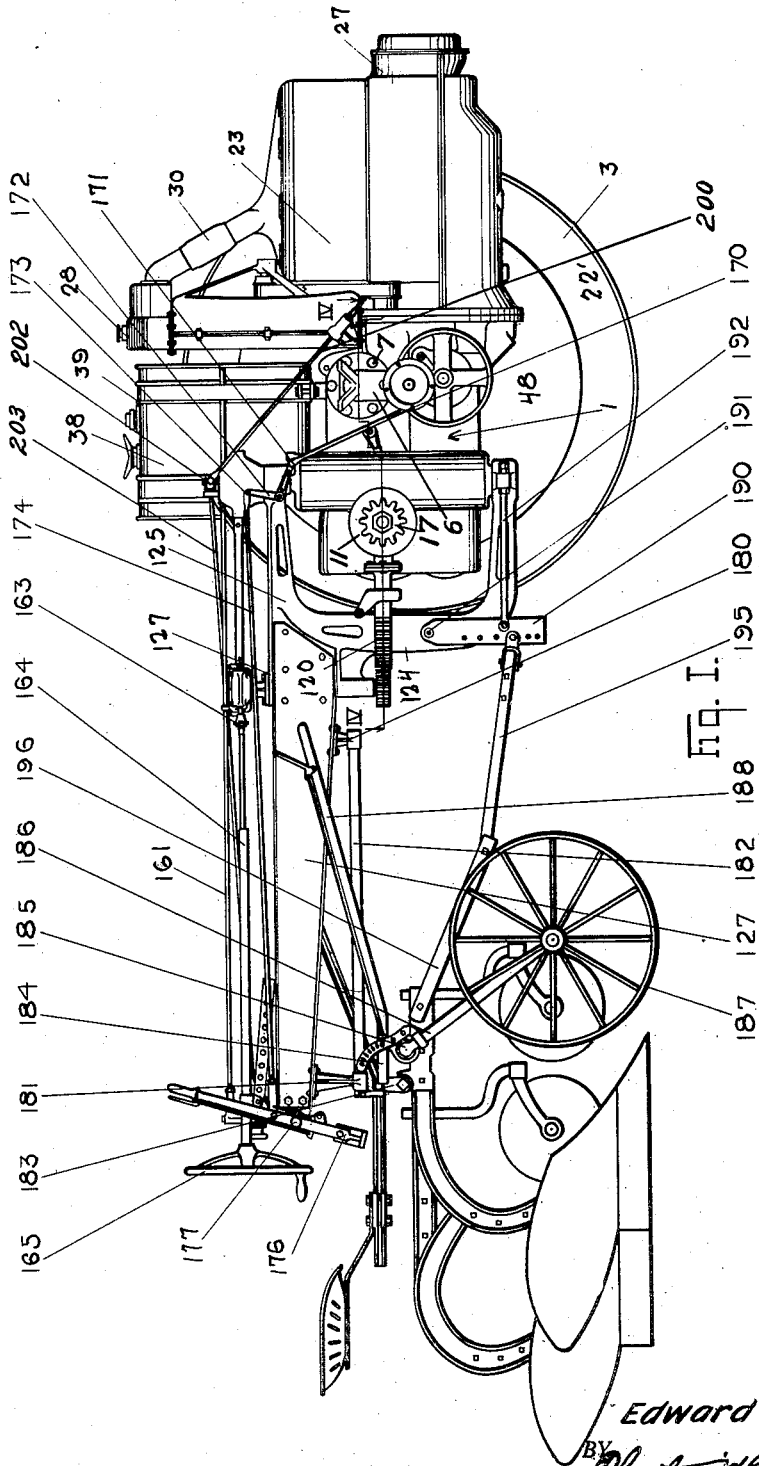

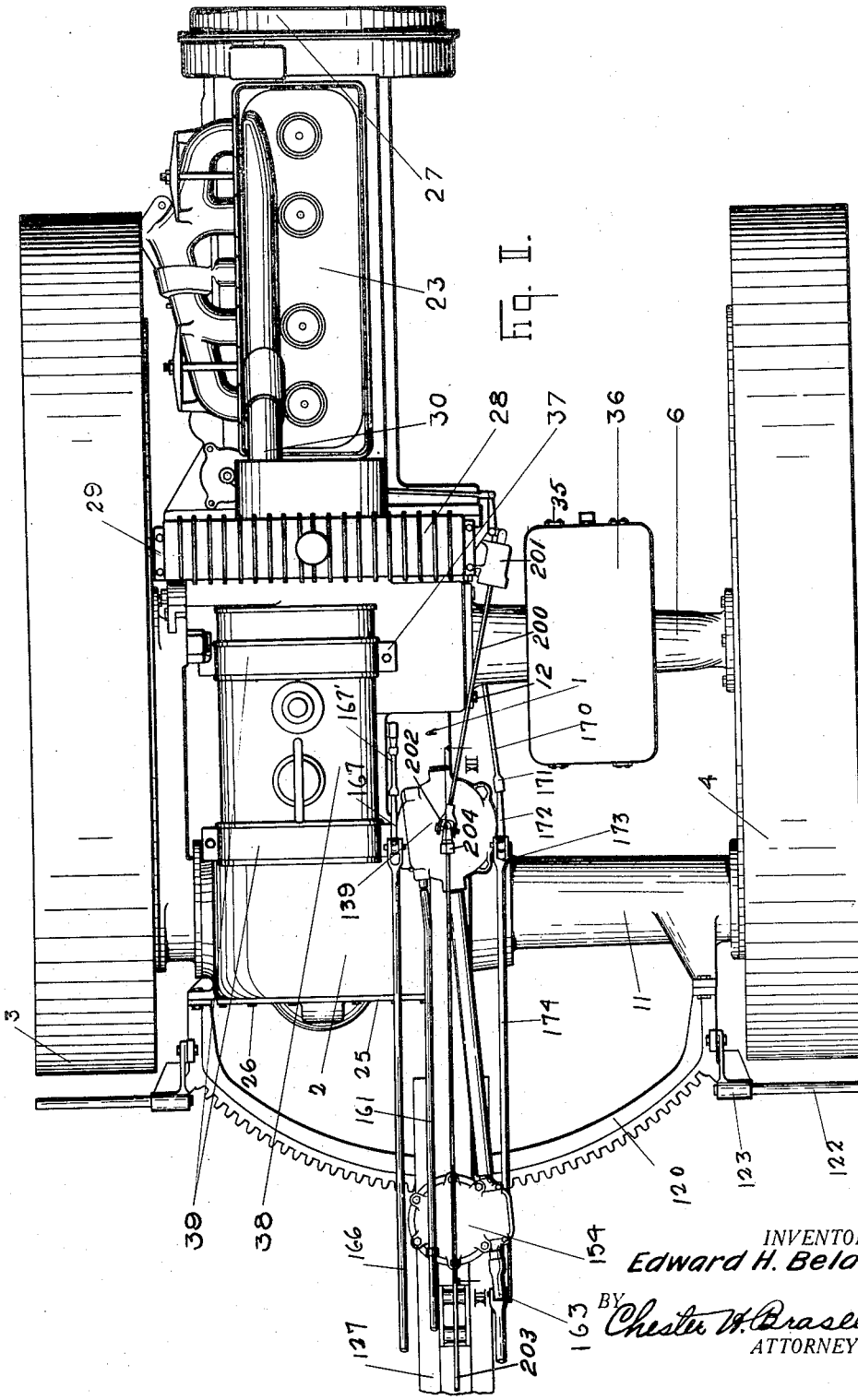

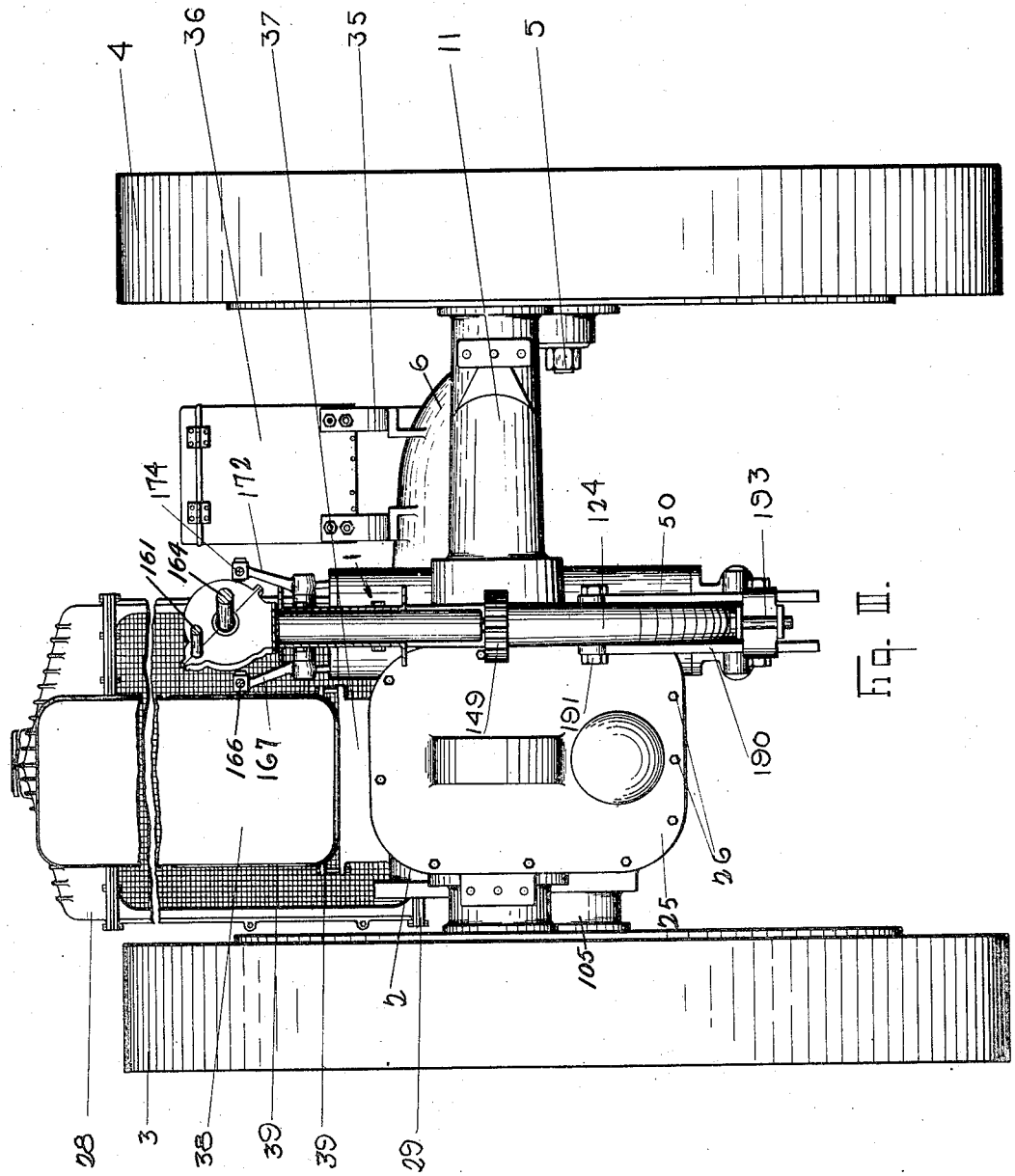

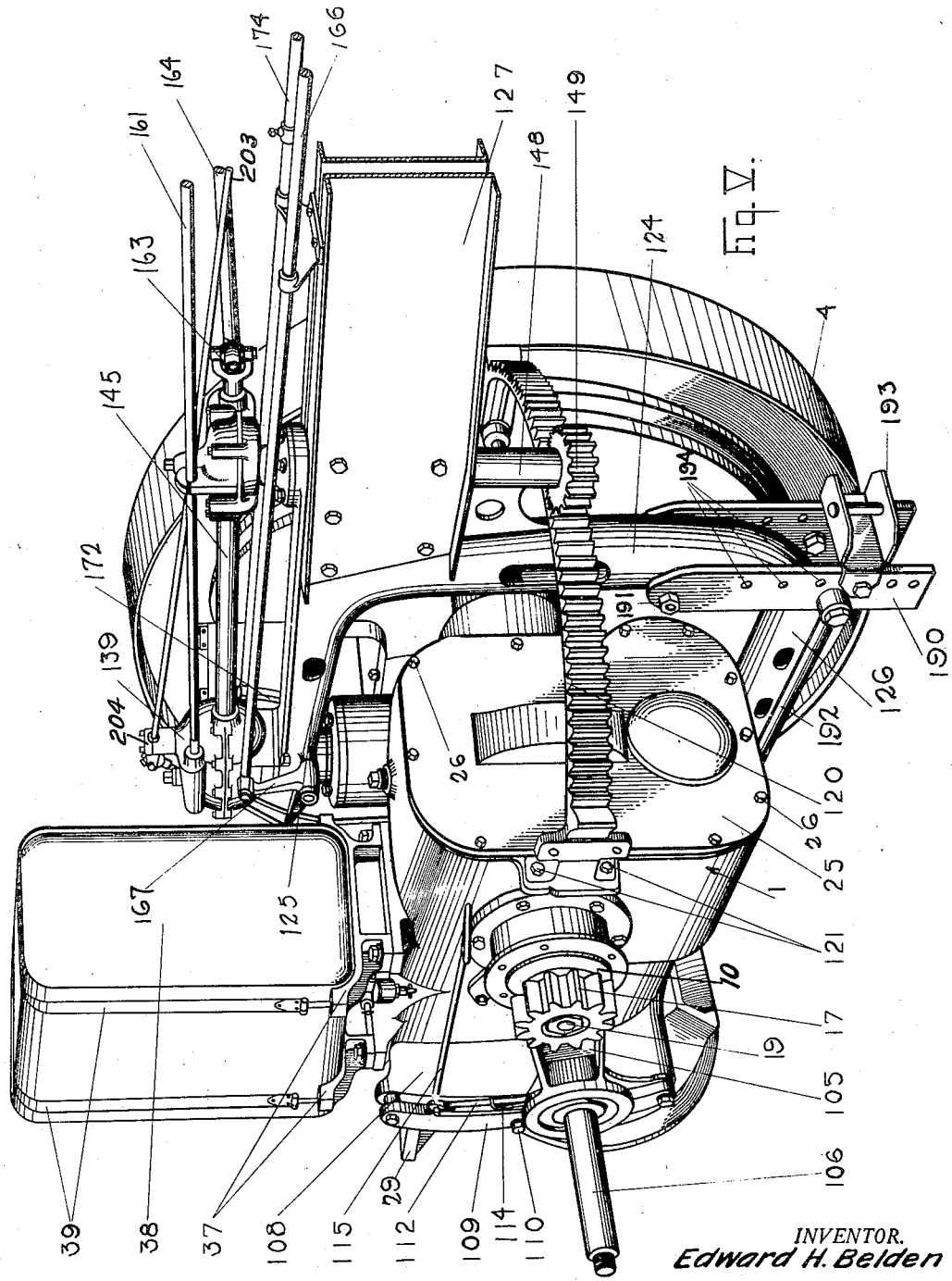

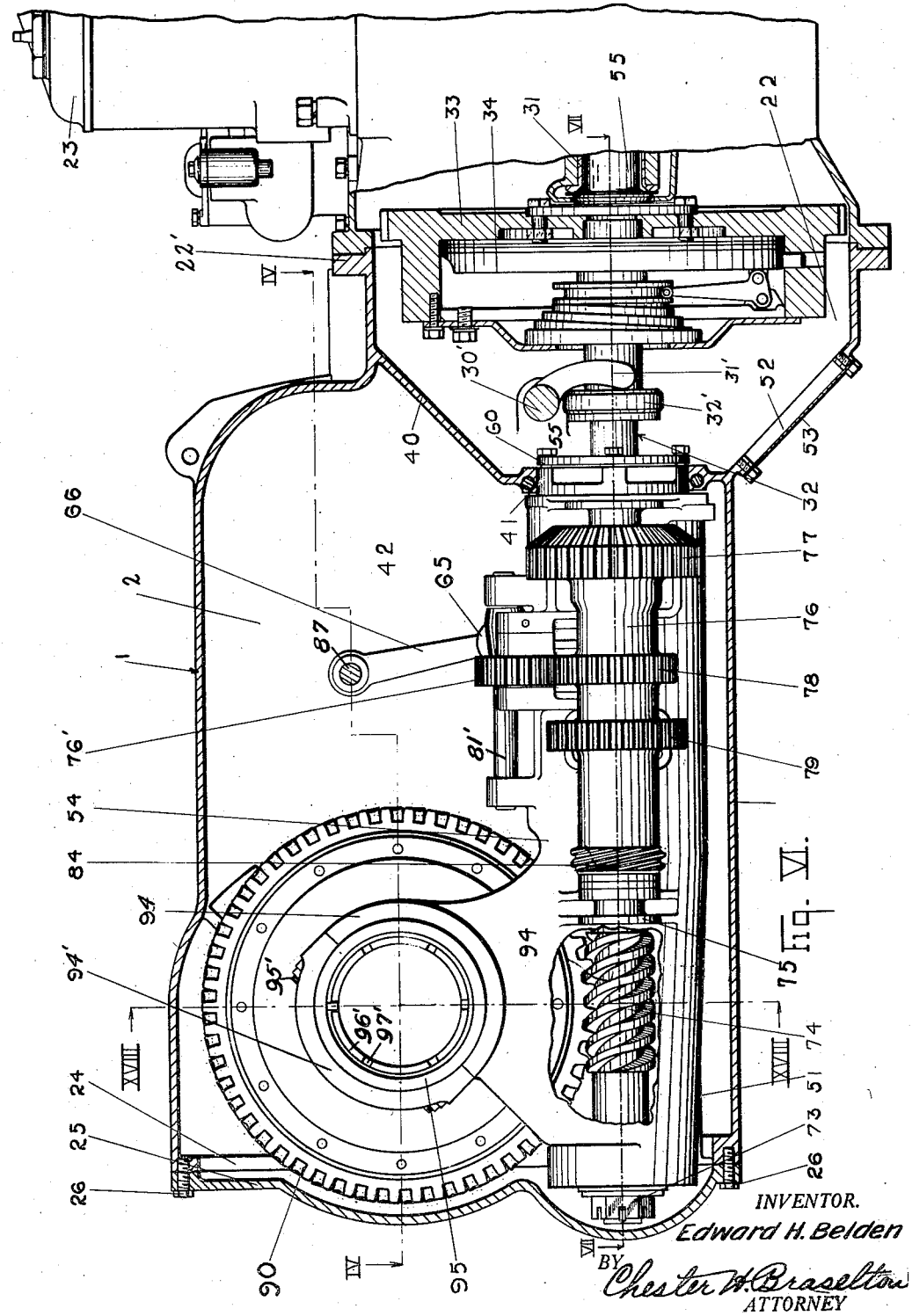

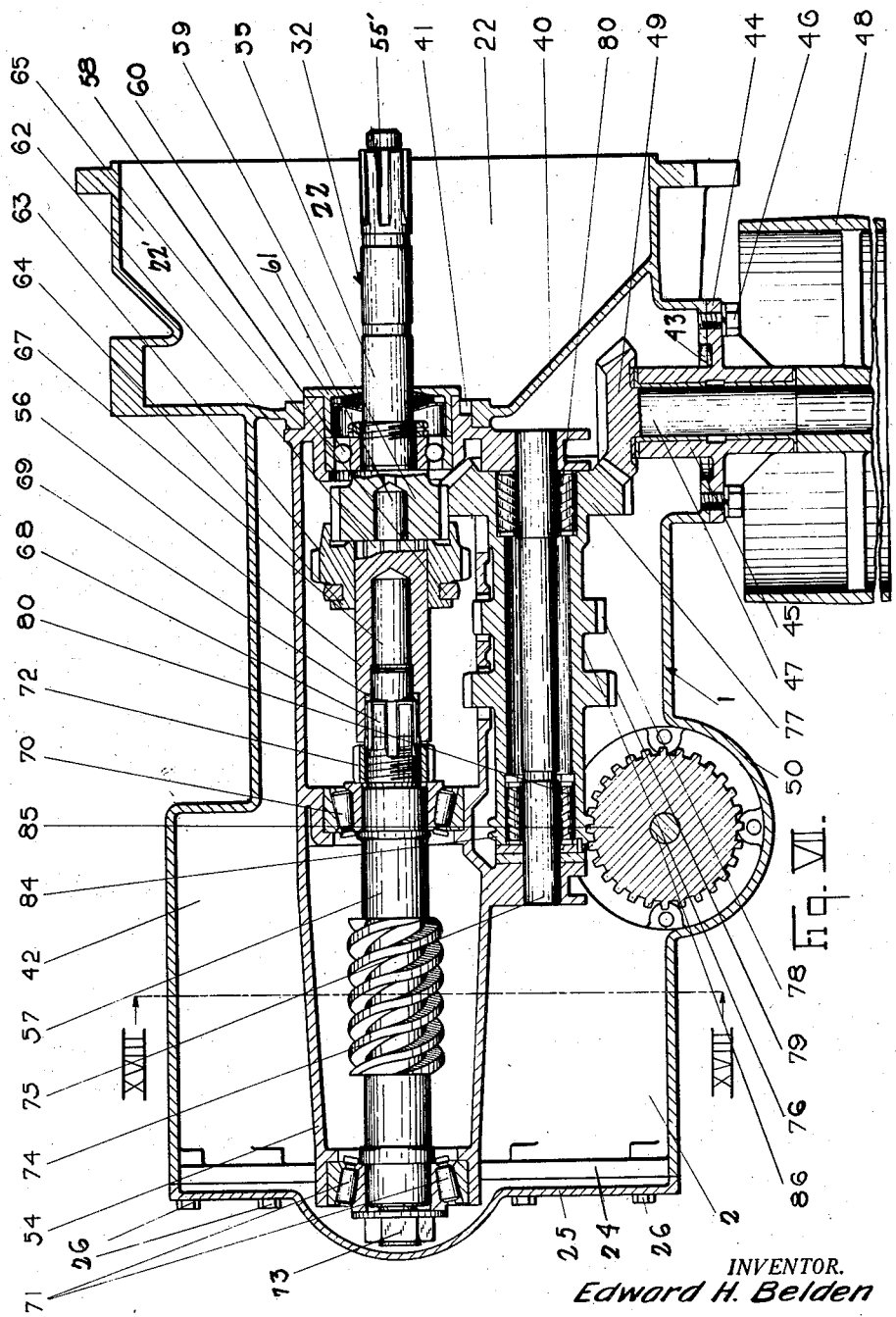

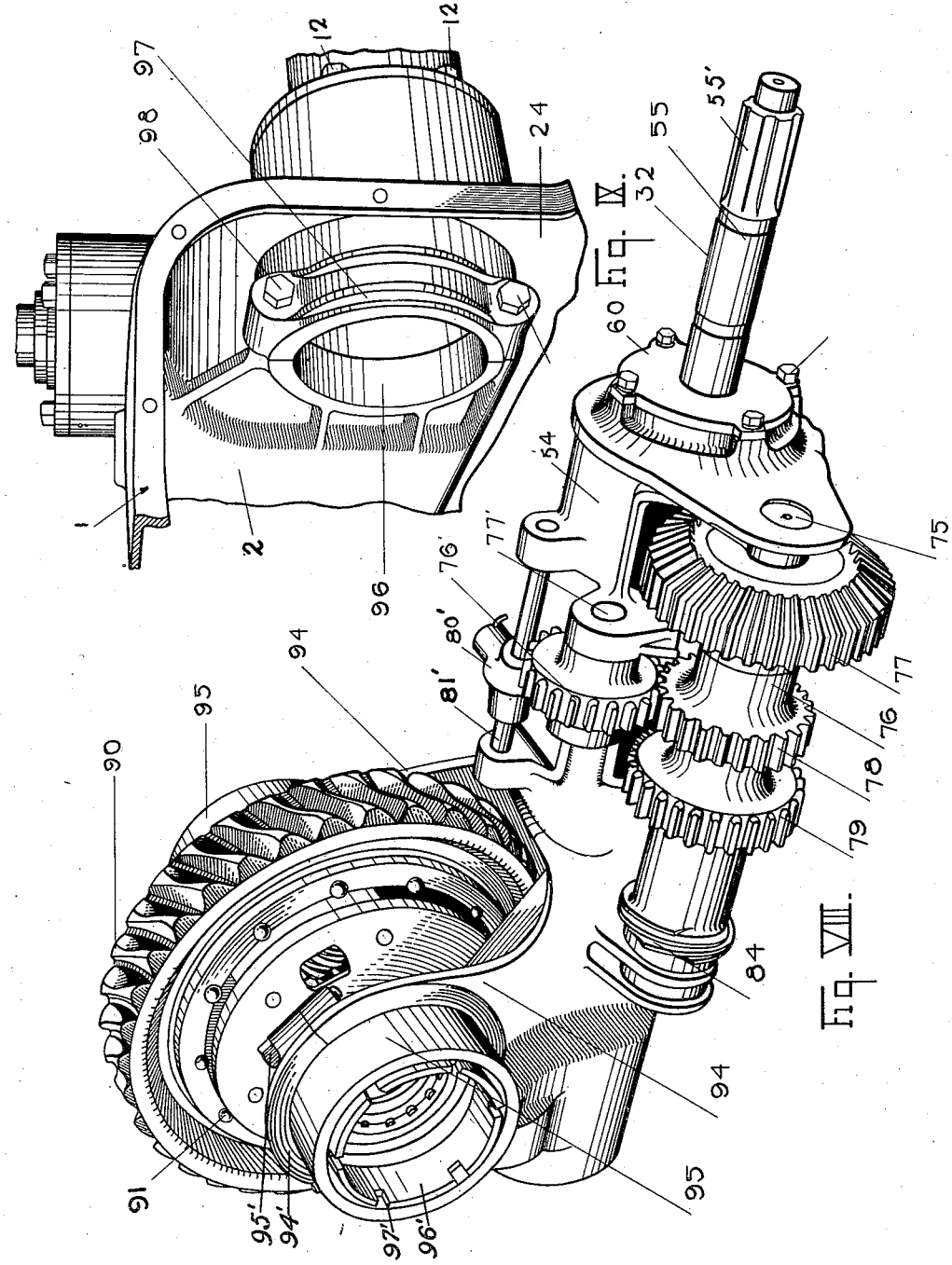

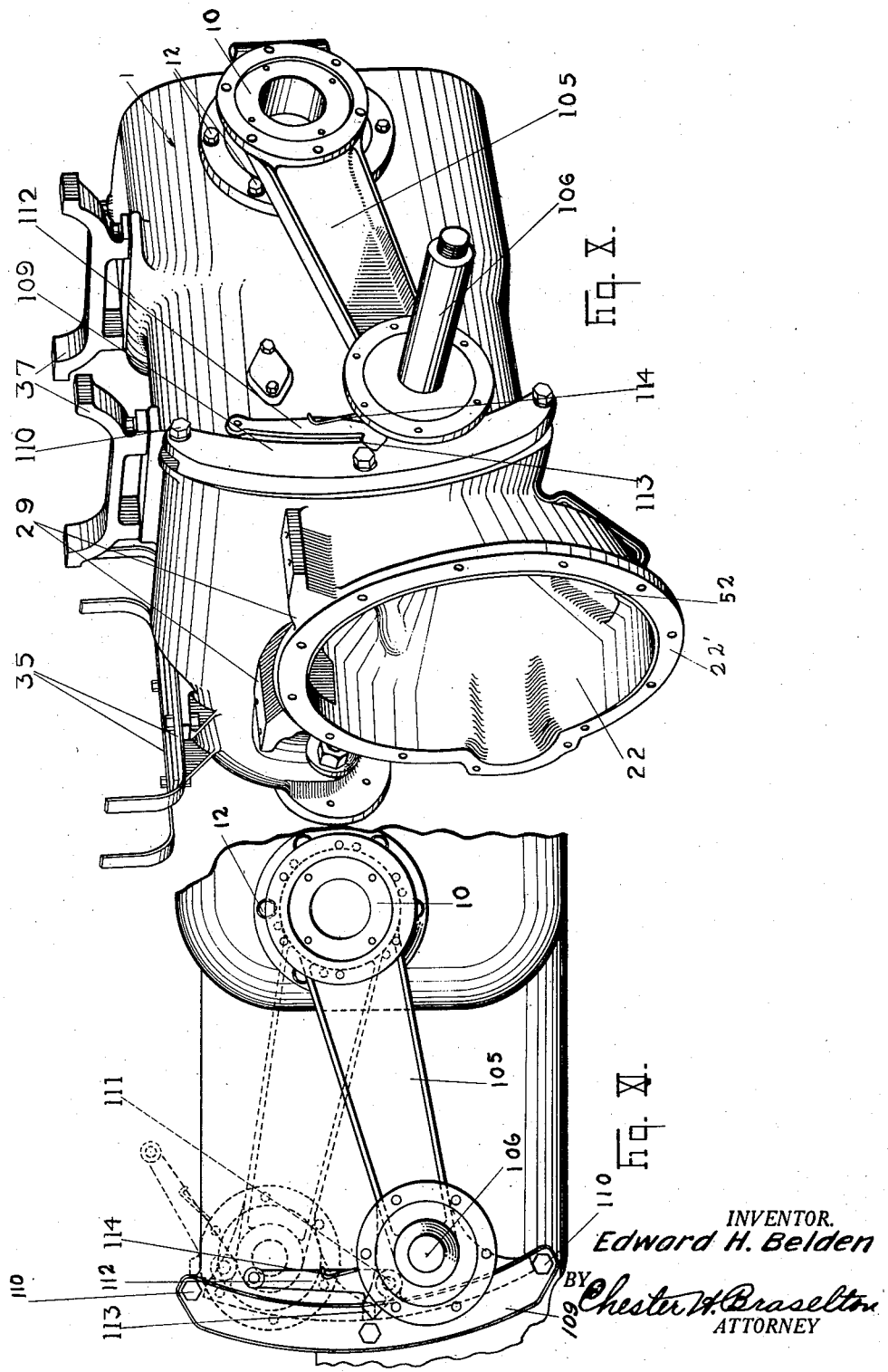

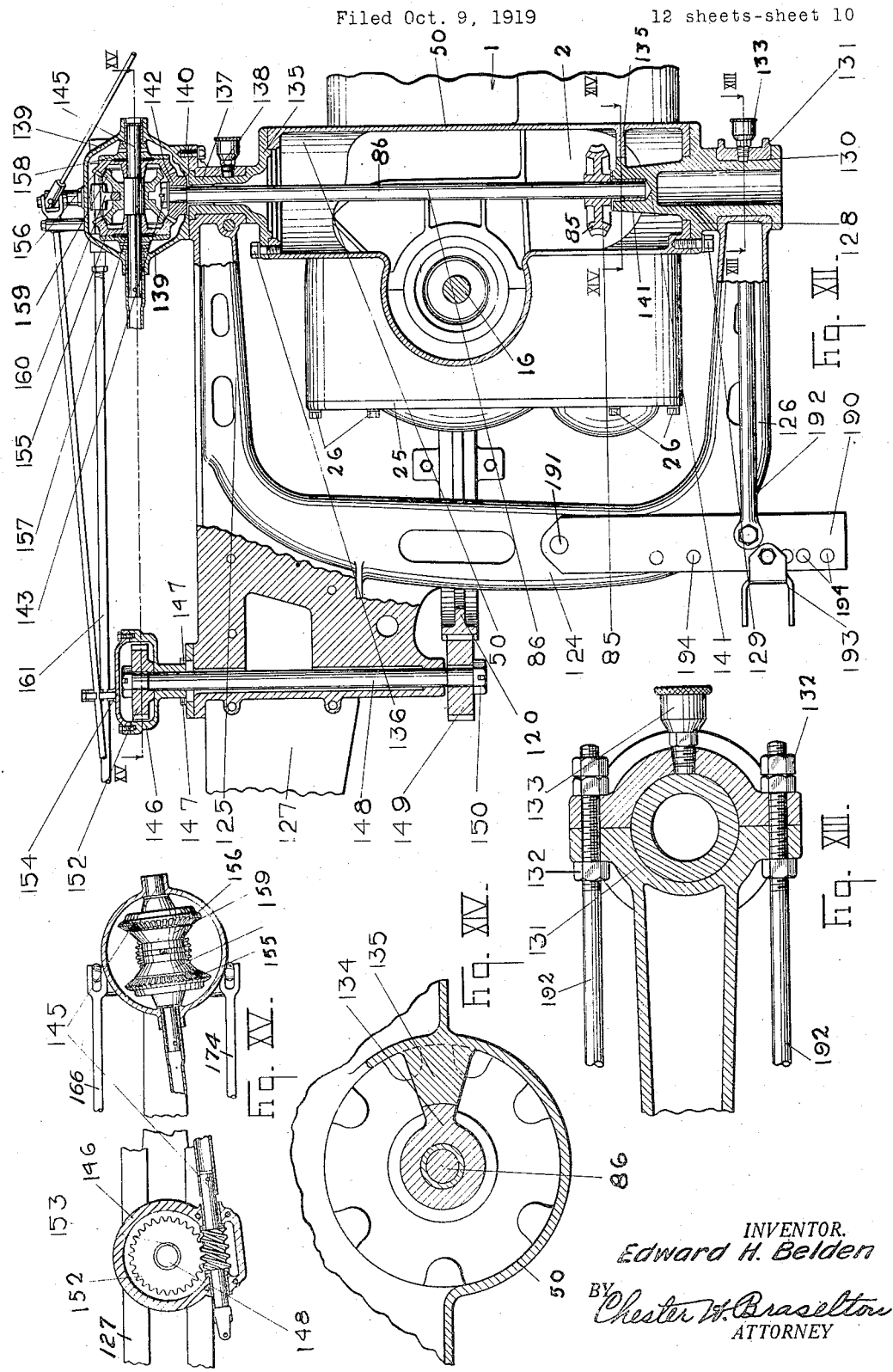

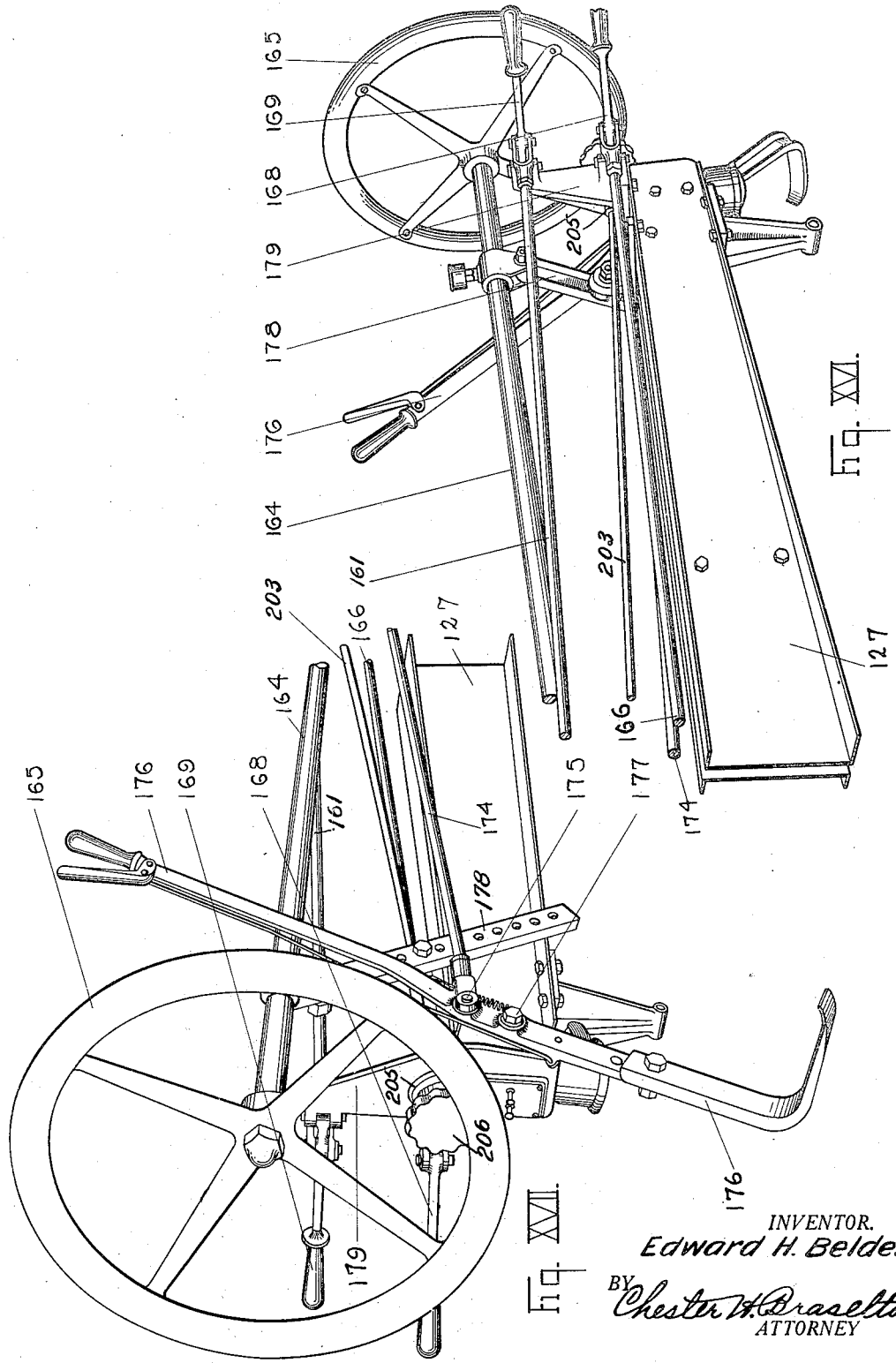

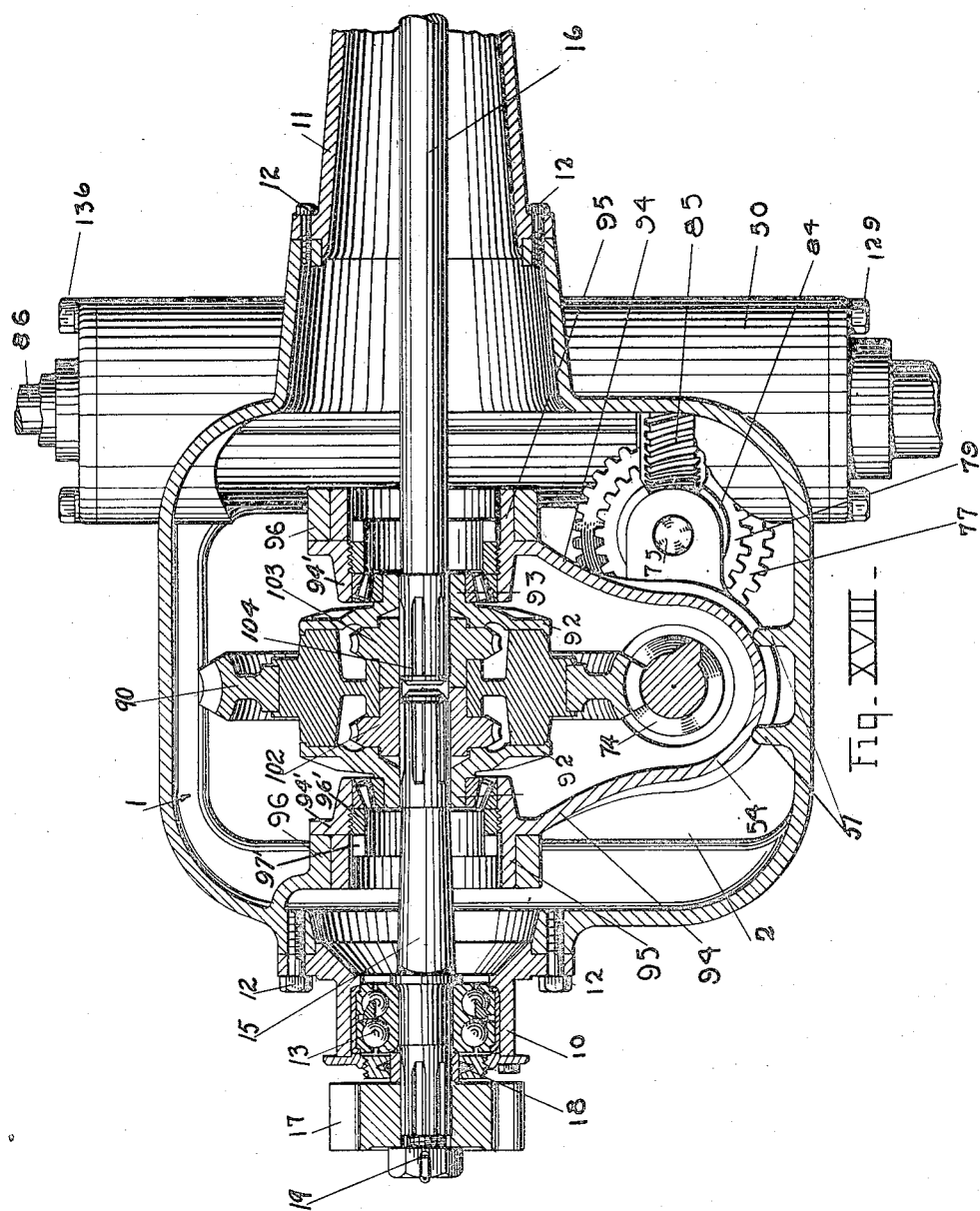

Patented Apr. 17, 1923.

1,452,262

UNITED STATES PATENT OFFICE.

EDWARD H. BELDEN, OF TOLEDO, OHIO, ASSIGNOR TO THE WILLYS-OVERLAND COMPANY, OF TOLEDO, OHIO, A CORPORATION OF OHIO.

TRACTOR.

Application filed October 9, 1919. Serial No. 329,429.

*To all whom it may concern:*

Be it known that I, EDWARD H. BELDEN, residing at Toledo, county of Lucas, State of Ohio, have invented certain new and useful Improvements in Tractors, of which I declare the following to be a full, clear, and exacting description.

This invention relates to improvements in tractors, particularly tractors of the unstable or balanced type wherein the main frame portion of the tractor is positioned between and mainly supported by a pair of oppositely positioned ground wheels, and which relies for its additional support upon that afforded by the trailing implement with which the tractor is associated.

One object of the present invention is to provide a unitary transmission mechanism capable of being bodily positioned within and removed from the transmission casing.

A further object of the invention is to provide a unitary differential and transmission mechanism capable of being bodily positioned within and removed from the casing, thus providing means for readily removing the entire actuating mechanism from the casing as a unit.

A further object of the invention is to provide an improved assembly for the transmission and differential mechanism, whereby the various elements will be retained in position relative to each other so as to form a unitary structure capable of removal from and replacement within the main casing.

Further objects will appear from a detailed description of the invention which consists in the features of construction and combination of parts hereinafter described and claimed.

The objects of the invention are accomplished in one instance by the devices and means described in the following specification, but it is evident that the same may be varied widely without departing from the scope of the invention as pointed out in the appended claims.

A structure constituting one embodiment of the invention, which may be the preferred, is illustrated in the accompanying drawings forming a part hereof in which:

Figure I is a side elevational view of the tractor and the trailing implement drawn thereby.

Figure II is a top plan view of the main forward portion of the tractor.

Figure III is a rear elevational view of the front portion of the tractor, certain of the structure being broken away.

Figure IV is a horizontal sectional view, taken along the line IV—IV of Figures I and VI, and showing the relative position of the different parts of the transmission and differential mechanism with respect to the main frame of the tractor and the supporting wheels.

Figure V is a perspective view of a portion of the main frame of the structure, showing the manner of mounting the land wheel to permit vertical adjustment of the same relative to the main frame and to illustrate the position of the control mechanism relative to the rear end of the transmission casing.

Figure VI is a vertical sectional view taken through the main casing, illustrating the position of the combined transmission and differential unit with respect to the casing and the engine power shaft.

Figure VII is a horizontal sectional view, taken along the line VII—VII of Figure VI, and illustrating the relative position of the certain elements of the combined transmission and differential unit.

Figure VIII is a perspective view of the combined transmission and differential unit.

Figure IX is a perspective view of a portion of the main casing, showing the manner of securing the combined transmission and differential unit within the casing.

Figure X is a perspective view of the front end portion of the main casing, and the adjustable means for mounting the land wheel.

Figure XI is a side elevational view of a portion of the main casing, showing the mechanism for adjustably mounting the land wheel in its two adjusted position.

Figure XII is a side elevational view, partially in section, illustrating the manner of pivoting the yoke member to the main frame, and the power steering mechanism for controlling the movement of the tractor.

Figure XIII is a detail view, taken along the line XIII—XIII of Figure XII.

Figure XIV is a detail sectional view, taken along the line XIV—XIV of Figure XII.

Figure XV is a detail sectional view, taken along the line XV—XV of Figure XII, showing a part of the power steering system.

Figure XVI is a perspective view illustrating the position of the controlling devices carried by the rearwardly extending portion of the yoke member.

Figure XVII is a perspective view, taken from the opposite side of the machine from Figure XVI, and illustrating the controlling mechanism carried by the rearwardly extending portion of the yoke member.

Figure XVIII is a vertical transverse sectional view, taken along the line XVIII—XVIII of Figures VI and VII, illustrating more in detail the differential mechanism and the manner of securing the combined transmission and differential mechanism within the casing.

Referring to the drawings, similar reference characters designate corresponding parts throughout the several views, and the sectional views are taken looking in the direction of the small arrows at the ends of the section lines.

In the embodiment of the invention illustrated herewith, 1 designates the main frame portion of the tractor which comprises a transmission and differential housing 2 located between and supported mainly by a pair of ground engaging wheels 3 and 4. The ground wheel 3 is the land wheel of the tractor and is adapted to be adjusted vertically with respect to the main frame by means of a structure which will be described more in detail hereinafter.

The ground wheel 4 which is the furrow wheel of the tractor is rotatably supported by a stub axle 5 carried by a supporting arm 6 which is secured to the main frame by means of a plurality of bolts 7. Internal gears 8 and 9 are carried by the supporting wheels 3 and 4 respectively, and provide means for imparting tractive force to the wheels from the power system of the tractor. Sleeves 10 and 11 are secured to opposite sides of the main frame by means of bolts or other suitable fastening devices 12, and the sleeves are provided with suitable antifriction bearings 13 and 14 respectively, for rotatably supporting oppositely extending aligned shafts 15 and 16, the said shafts being each provided with pinions 17 positioned upon the outer extremity thereof and adapted to mesh with one of the internal gears 8 and 9 for the purpose of transmitting tractive force to the wheels from the power system of the tractor. Dust caps 18 may be secured to the outer ends of the sleeves 10 and 11 to prevent dust or other foreign matter from access to the interior portion of the sleeves and main casing. The pinions 17 are nonrotatably attached to the end portions of the shafts 15 and 16 respectively and are secured thereon in any suitable manner as by means of nuts 19.

The ground engaging wheels 3 and 4 are each provided with a circular opening 20, so positioned as to be located directly opposite the pinion 17 upon suitable rotation of the ground engaging wheels, for the purpose of providing means for withdrawing the pinions from engagement with the gears 8 and 9 at such times as it may be desirable to disassemble the driving mechanism. A cover plate 21 of suitable shape and form is provided for attachment to the central portions of the ground engaging wheels, and serves as a closure for the openings 20 formed therein. The longitudinal axis of the transmission casing 2 is located substantially parallel with the direction of movement of the ground engaging wheels, and the transmission casing is provided with an opening formed at each end thereof, the opening 22 formed in the forward end portion of the transmission casing being preferably surrounded by an annular flange 22' positioned to permit the engine 23 to be secured thereto by means of proper fastening devices. The opening 24 formed in the rear end portion of the transmission casing is adapted to be closed by means of a cover plate 25 attached thereto by means of screws 26.

The engine 23 may be any of the ordinary forms of internal combustion engines generally used in connection with devices of this character, and the parts are arranged so that the fly wheel is positioned within the opening 22 formed in the forward end portion of the transmission casing, and the usual radiator 28 is supported by brackets 29 carried by the forward end portion of the transmission casing, whereby the radiator is located at the rear of the engine casing and adjacent the main portion of the transmission housing. The radiator 28 is connected with the engine by means of connecting pipes 30 in the usual and ordinary manner. The main power shaft 31 of the engine is located in alignment with the transmission shaft 32 and is operatively connected therewith by means of a fly wheel 33 secured to the rear end portion of the engine shaft, and a clutch mechanism 34 cooperating therewith.

Brackets 35 are supported by the supporting arm 6, and a battery box 36 is carried by these brackets and supported in operative position relative to the main portion of the main frame. A plurality of brackets 37 are carried by the transmission casing and support the fuel tank 38, straps 39 co-operating with said brackets for the purpose of retaining the fuel tank in proper position relative thereto.

The transmission casing 2 provided for the purpose of housing the transmission mechanism will now be described more in detail. The front open ending portion 22 of this casing is formed of such size as to provide sufficient room for the reception of the fly wheel and the clutch mechanism co-operating therewith, and an inwardly extending partition 40 is provided which extends inwardly from the outer wall of the transmission casing and serves to partially divide the casing into separate chambers. The wall 40 is provided with a substantially circular opening 41 formed therein, which is adapted to receive the forward end portion of the transmission unit, and assists in retaining the same in proper position relative to the casing. The rearward chamber formed in the casing by the wall 40 is designated by the reference character 42, and is adapted to receive and house the major portion of the differential and transmission mechanism. An opening 43 is provided in the side wall of the transmission casing at the rear of the dividing wall 40 and a plate 44 supporting a bearing 45 is secured to the side wall of the transmission casing by means of bolts 46 to form a closure for the opening 43. A stub shaft 47 is rotatably mounted within the bearing 45 carried by the plate 44, and this stub shaft carries a pulley 48 firmly secured to one end portion thereof while a bevel gear 49 is formed integral or rigidly secured to the opposite end portion of the stub shaft and so positioned as to mesh with a bevel gear carried by the transmission mechanism, when the transmission mechanism is operatively positioned within the casing. The casing 2 is provided with a substantially cylindrical shaped portion 50 which is offset from one side of the main portion of the casing, and occupies a substantially vertical position near the rear end of the casing. The transmission casing 2 is provided with a pair of ribs or rails 51 formed upon the base portion thereof which are adapted to serve as tracks upon which the combined transmission and differential unit may be slid when the same is positioned within or removed from the transmission casing. The forward portion of the casing is provided with an opening 52 which serves to give access to the clutch mechanism, and a cover plate 53 may be provided for attachment to the casing to provide a closure for the opening. A clutch controlling shaft 30' is mounted in suitable bearings formed in the forward portion of the casing and extends transversely of the casing, the shaft being provided with a pair of downwardly extending arms 31' positioned upon the opposite sides of the transmission shaft and adapted to co-operate with a portion of the clutch sleeve 32' for actuating the clutch mechanism. The controlling shaft above described has a portion projecting outwardly from the casing and means controlled from the rear of the tractor is provided for rotating the same to actuate the clutch.

The combined transmission and differential unit mechanism will now be described in detail. It will be observed upon reference to several figures of the drawings that this mechanism is enclosed within a supplemental casing 54 which serves to retain the several operative parts in proper position relative to each other under all conditions of use, while at the same time this supplemental casing, together with the transmission and differential mechanism carried thereby is capable of being readily and easily positioned within and removed from the transmission casing as a unit, thereby providing means for entirely disassembling the power system of the tractor and removing the several operative parts for the purpose of replacement or repairs whenever such action may become necessary. Revolvably mounted within the supplemental casing 54 is a transmission shaft which may be generally designated by the reference number 32, this transmission shaft may be composed of several sections, in the present instance three in number, which are particularly designated as 55, 56 and 57. These several sections of the transmission shaft are positioned in substantial alignment with each other and with the main power shaft of the engine, thus serving to provide a direct drive upon the high gear from the engine power shaft without the necessity of employing reduction gears between the engine power shaft and the transmission shaft when it is desired to operate the mechanism at high speed. The forward section 55 of the transmission shaft is provided at the forward end thereof with a splined portion 55' adapted to be connected with the main power shaft of the engine through the clutch connection previously described. The forward section 55 is rotatably supported in an anti-friction bearing 58 positioned within the forward end portion of the supplemental casing, and is provided at the rear end thereof with a pinion 59 formed integral with or firmly secured to the forward section 55 of the transmission shaft. A dust cap 60 is preferably positioned within the forward end of the supplemental casing to surround the forward section 55 of the transmission shaft and prevent dust or other foreign matter from having access to the transmission mechanism. The intermediate section 56 of the transmission shaft is provided with a reduced forward end portion 61 rotatably mounted within a recess formed substantially centrally of the gear 59 whereby the shaft sections 55 and 56 are capable of rotation relative to each other when not operatively connected together. The section 56 is provided with a plurality of splines 62 formed upon the outer surface and a gear 63 is slidably mounted upon the exterior surface of the section 56, the said gear being provided with a shouldered portion 64 capable of being engaged by a forked arm 65 carried by the shifting lever 66, carried by a shaft 87 rotatably mounted in the casing. The rearward section 57 of the transmission shaft is provided with a forwardly extending reduced portion 67 telescoping within a central recess formed in the section 56, and a splined portion 68 telescoping within and mating with a correspondingly splined interior portion 69 of the intermediate section 56. The rearward section 57 of the transmission shaft is rotatably mounted in anti-friction bearings 70 and 71 carried by the supplemental casing 54, and a lock nut 72 may be fitted upon the forward end portion of the section 57 and bear against a portion of the anti-friction bearing 70 for the purpose of retaining the elements of the anti-friction bearing in proper position relative to each other and securing suitable engagement of the same with the section 57. In a similar manner a nut 73 is fitted upon the rear end portion of the section 57 and bears against a portion of the anti-friction bearing 71 in order to retain the elements of the bearing suitably positioned relative to each other. The section 57 is provided with a worm 74 formed thereon intermediate the ends of the section 57 which is adapted to mesh with the differential gear in a manner which will be more fully described hereinafter.

It will be seen from the foregoing description that the forward section 55 of the transmission shaft is actuated directly from the power shaft of the engine upon engagement of the clutch mechanism thus imparting rotative movement to the section 55. The intermediate section 56 and the rear section 57 are rotatably connected with each other by means of the mating splined portions 68 and 69 whereby rotative movement is communicated to the rear section 57 upon rotation of the intermediate section 56. A countershaft 75 is mounted in bearings carried by the supplemental casing 54, and a sleeve 76 is rotatably mounted upon the shaft 75 and provided with a plurality of gears 77, 78 and 79. Anti-friction bearings 80 are positioned between the shaft 75 and the sleeve 76, thus permitting the sleeve to rotate freely upon the shaft. The gear 77 is a compound bevel and spur gear and is adapted to mesh with the pinion 59 carried by the forward section 55 of the transmission shaft, thus communicating rotation to the sleeve 76 upon rotation of the forward section 55 of the transmission shaft. The bevel gear portion of the gear 77 meshes with the pinion 49 previously described and communicates rotation of the forward section 55 of the transmission shaft. The bevel portion of the gear 77 meshes with the pinion 49 previously described and communicates rotation to the stub shaft 47 and the pulley 48 carried thereby upon rotation of the forward section 55 of the transmission shaft.

It will be seen from the above description that the manner of communicating rotative movement to the various operative parts from the forward section 55 of the transmission shaft is as follows:

Upon rotation of the forward section 55 of the transmission shaft, the sleeve 76 is rotated together with the gears carried thereby as well as the stub shaft 47 and the pulley 48. When it is desired to transmit rotative movement to the rear portions of the transmission shaft at high speed, the gear 63 is slid forwardly whereupon it clutches with the gear 58 as illustrated in Figure VII of the drawings and the several sections of the transmission shaft are rotated in unison. When the gear 63 is moved rearwardly on the shaft 56, it is placed in mesh with a gear 76' carried by a shaft 77' and so arranged as to be constantly in mesh with the gear 78. In this position of the parts the rearward section 57 of the transmission shaft is rotated in the opposite direction and at a reduced speed. Upon a further movement of the gear 63 rearwardly, the gear is placed in meshing engagement with the gear 79 carried by the countershaft, whereby the rearward portion 57 of the transmission shaft is rotated in the same direction as when the gear 63 is in mesh with the gear 59 carried by the section 55 of the transmission shaft. It will be seen from the above description that the form of transmission mechanism illustrated herewith provides means for giving the tractor forward movement at high speed with direct drive from the power shaft, and a low speed, together with means for propelling the tractor rearwardly at low speed. A worm 84 is carried by one end of the sleeve 76 and engages with a worm gear 85 carried by a vertical shaft 86 mounted within the cylindrical portion 50 of the casing which will be hereinafter described. The shifter arm 66 is carried by a shaft 87 suitably mounted in bearings 88 positioned within the transmission casing. The shifter arm 66 operatively engages a forked gear controlling arm 80', slidably mounted upon a shaft 81' carried by the supplemental casing 54, as shown in Figure VIII of the drawings.

This gear controlling arm comprises the forked arm 65 embracing a portion of the gear 63 for actuating the same.

The worm 74 previously described meshes with a worm gear 90 to the opposite sides of which are firmly secured, as by bolts 91, a pair of cover plates 92, said cover plates being provided with outwardly extending bearing portions 93 anti-frictionally supported within upwardly extending brackets 94 carried by and preferably formed integral with the supplemental casing 54. These brackets 94 are each provided with outwardly extending cylindrical portions 95 which are adapted to be seated within substantially semi-circular bearings 96 carried by the main portion of the transmission casing and retained therein by means of collars 97 co-operating with the seats 96 to form a bearing therewith, the collars 97 being removably held in suitable position relative to the seats 96 by means of bolts 98. By means of the structure just described, the unitary transmission and differential mechanism may be inserted within the supplemental transmission casing as a unit whereupon the forward end portion of the supplemental casing is positioned within the opening 41 formed in the wall 40 and the oppositely positioned bearing portions 95 are seated within the seats 96 in which position the unitary transmission and differential mechanism together with the supplemental casing in which it is enclosed are retained in proper position within the transmission casing by means of the collars 97 being clamped over the bearing portions 95 and removably secured in position by means of the bolts 98.

The inwardly extending portions of the brackets 94 serve as supports for the anti-friction bearings in which the outwardly extending portions 93 of the cover plates are mounted, and these inwardly extending portions are preferably constructed so that a semi-circular part thereof is formed integral with the supplemental casing while the remaining part is in the form of a separate plate 94' which fits against and is secured to the part of the bearing formed integral with the casing by means of bolts 95'. The part of each bearing which is formed integral with the casing and the separable plate cooperating therewith, are provided with an internal thread within which is threaded a locking sleeve 96' for engaging the outer member of the anti-friction bearing and retaining the same in position within the bracket 94. Each locking sleeve is provided with a plurality of notches 97' formed in the outer end portion thereof, whereby the same may be engaged by a suitable tool for effecting the removal of the locking sleeve from the bracket when desired. By forming each bracket with a removable plate in the manner described, means is provided for bodily removing the differential gear from the casing, since by first detaching the removable plates 94' the worm gear 90, together with the cover plates 92 secured thereto, can be readily lifted from the brackets 94 when the aligned shafts 15 and 16 have been withdrawn from the casing. This construction permits a complete removal of the differential mechanism from the supplemental casing, either when the supplemental casing is retained in position within the main casing, or after it has been removed therefrom. The differential mechanism can be readily repaired and replaced in position within the casing or another differential gear may be substituted for the one removed.

Positioned within and revolvably carried by the gear 90 are a plurality of worms 100 and 101 arranged in pairs upon opposite sides of the gear. Worm gears 102 and 103 are positioned within the gear 90 and in substantial alignment with each other, being rotatably mounted with respect to the gear 90 and positioned in such a manner as to mesh with the worms 100 and 101 respectively. The shafts 15 and 16 are each provided with a splined portion 104 adapted to fit within a correspondingly formed splined recess in the gears 102 and 103 respectively. By means of this construction the rotative movement of the shaft section 57 is communicated to the gear 90, and by the differential mechanism previously described, rotative movement is imparted to the shafts 15 and 16 in the usual and ordinary manner. It will be evident that this construction permits the shafts 15 and 16 being readily removed from and positioned within the bearings by which they are carried to properly position these shafts whereby they will communicate power from the differential mechanism to the supporting wheels 3 and 4.

The mechanism for mounting the land wheel to permit vertical adjustment of the same will now be described. The sleeve 10 within which the shaft 15 is rotatably mounted is provided with an outer bearing surface upon which is rotatably mounted one end of an arm 105, the said arm extending forwardly and being provided with a stub-axle 106 carried by the forward end portion thereof and extending outwardly therefrom, the shaft being retained in position relative to the arm by means of a lock nut 107. The ground engaging wheel 3 is rotatably mounted upon the stub-axle 106 in the usual or any ordinary manner, and the arm 105 is provided at a point adjacent to the forward end thereof with a portion 107' which slides between a flat metal portion 108 formed upon the casing and a flat arc-shaped metal plate 109 secured to the flat metal portion 108 of the casing by means of a plurality of screws or suitable devices 110. Pivotally mounted as at 111 to the forward end portion of the arm 105 is a latch 112 normally held in engagement with a detent 113 by means of a spring 114. A latch actuating rod 115 is pivotally secured to the upper end portion of the latch so that upon the rearward movement of the rod 115, the latch may be disengaged from the detent 113 to permit upward movement of the forward end of the arm relative to the casing, together with the wheel carried thereby. When it is desired to lower the main frame relative to the land wheel, the rod 115 is actuated in the manner previously described, which permits the main frame to become lowered relative to the land wheel, the forward end portion of the arm, together with the latch carried thereby, then assuming the position shown in dotted lines in Figure XI of the drawings, the free end of the arm 105 then engaging with the upper bolt 110 which forms a stop therefor. When it is desired to return the main frame to the position shown in Figure X relative to the land wheel a block is placed in the rear of the land wheel and the direction of movement of the tractor reversed, thus causing the arm to be rotated into the position shown in Figure X of the drawing whereupon the latch 112 engages with the detent 113 until such time as it is again desired to lower the main frame relative to the wheel.

A steering segment 120 is secured to the rearward portion of the main frame or casing by means of bolts or other suitable fastening means 121, and the steering segment projects rearwardly being so positioned as to readily permit the removal of the cover plate 25 and the withdrawal and insertion of the combined differential and transmission mechanism within the transmission casing as shown in Figures IV and V of the drawings. Supports 122 which may be employed for carrying scrapers of any desired type, are secured to the opposite sides of the steering segment to project beyond the same and be positioned in operative relation to the ground engaging wheels 3 and 4, the supports 122 being preferably carried by brackets 123 secured to the opposite sides of the steering segment.

Projecting rearwardly from the main frame portion of the tractor is a yoke member 124 provided with an upper arm 125 and a lower arm 126, together with a rearwardly extending portion 127. The upper and lower arms of the yoke member are preferably positioned above and below the central horizontal plane of the main frame, being adapted to project above and below the main frame and being pivotally connected to the main frame at points in vertical alignment with each other so as to insure proper pivotal movement of the yoke member, together with the rearwardly extending portion thereof with respect to the main frame of the tractor. The points of pivotal connection of the yoke member to the main frame are preferably located substantially midway between the ground engaging wheels 3 and 4, and in the embodiment of the invention illustrated herewith are formed of suitable connections carried by the cylindrical portion 50 of the main casing as shown in Figure XII. The vertical cylindrical portion 50 of the main casing is formed to provide suitable openings at the upper and lower ends thereof, these openings serving to provide suitable means for inserting the operating mechanism adapted to be enclosed within the cylindrical portion of the casing, as well as to provide seats for the connections to which the upper and lower arms of the yoke member are pivotally connected. A casting 128 is firmly secured to the lower end portion of the cylindrical casing 50 by means of bolts 129, and a portion of this casting projects within the cylindrical casing for a purpose which will be hereinafter described. The lower end portion of the casting 128 is provided with a reduced bearing portion 130 engaged by a split bearing 131 carried by the forward end of the lower arm 126, the parts of the split bearing being suitably clamped in position around the reduced portion 130 by means of nuts 132 threaded on the ends of the rods 192. An oil cup 133 may be carried by a portion of the split bearing and serves to provide lubricant for the bearing surfaces. That portion of the casting 128 which projects within the cylindrical portion 50 of the casing is provided with a lug 134 having a circular arc-shaped edge which is adapted to bear against and seat against the arc-shaped edge of a lug 135 which is formed integral with the cylindrical portion 50 of the casing and lies within the central longitudinal plane of the main frame. A casting 135' somewhat similar in construction to the casting 128 previously described, is secured to the upper end of the cylindrical portion 50 of the casing by means of bolts or suitable fastening devices 136, and this casting is provided with a reduced cylindrical portion 137 adapted to be engaged by a split bearing 138 carried by the upper arm 125 of the yoke, the bearing 138 being of similar construction to the bearing 131 previously described. A casing 139 is secured to the forward end portion of the upper arm 125 by means of screws 140, the casing being firmly secured to the upper arm so as to move with the yoke at all times as the yoke moves relative to the main frame portion of the tractor. A vertical shaft 86 previously mentioned is positioned within the cylindrical portion 50 of the casing, having the lower end thereof rotatably mounted in a recessed bearing 141 formed in the upper end portion of the casting 128, the gear 85 which is rotated by the worm 84 carried by the sleeve 76, is firmly secured to the lower portion of the shaft 86, while the upper end portion of the shaft is provided with a bevel gear 142 non-rotatably carried by the shaft and secured in position thereon by means of a suitable lock nut 143. A shaft 145 is rotatably positioned within the casing 139 and extends rearwardly therefrom, the rear end portion thereof being rotatably positioned within a casing 146 secured to the rearwardly extending portion of the yoke member by means of bolts 147. A vertical shaft 148 is rotatably mounted within the rearwardly extending portion of the yoke member at a point adjacent to the steering segment 120, and this shaft is provided at a point near the lower end portion thereof with a pinion 149 non-rotatably secured to the shaft and retained in position thereon by means of a suitable lock nut 150, the pinion 149 being positioned to mesh with the steering segment 120. The shaft 148 is provided at the upper end thereof with a worm gear 152 non-rotatably secured to the shaft and positioned within the casing 146 so as to mesh with a worm 153 carried by the rear end portion of the shaft 145. The worm 153 and worm gear 152 are positioned within the casing 146 which is provided with a cover plate 154 firmly secured thereon for the purpose of suitably enclosing the gears and preventing access of dust or other foreign matter thereto. Positioned within the casing 139 and rotatably mounted upon the shaft 145 so as to be positioned upon opposite sides of the gear 142 and to be in constant meshing engagement therewith are a pair of similar bevel gears 155 and 156. The opposite side of the gear 155 from that upon which the gear surface is carried is provided with a clutch surface normally slightly spaced from the corresponding clutch surface of a clutch member 157, which clutch member is keyed to the shaft 145 in any suitable manner. A similar clutch member 158 is positioned adjacent the gear 156, and is connected to the shaft 145 in a similar manner. A spider 159 is slidably and rotatably mounted upon the shaft 145 intermediate the gears 155 and 156, the spider is adapted to be actuated by means of a shifting arm 160 actuated by the rod 161. The mechanism just described comprises the essential features of the power steering device which is adapted to be employed for the purpose of steering the tractor from the power system of the same, thus avoiding the necessity of controlling the movement of the tractor by manual means.

As previously described the gear 85 is rotated by the worm 84 carried by the sleeve 76, thus communicating rotative movement to the vertical shaft 86 and the gear 142 carried thereby. The arm 160 is capable of being moved to force the spider 159 into contact with either of the gears 155 and 156, thus clutching the gear 155 to the clutch member 157 or the gear 156 to the clutch member 158 as may be desired. It will be readily understood that upon one of the gears being forced into clutching engagement with its associated clutch member, the shaft 145 will be rotated in one of two opposite directions, thereby communicating rotation to the vertical shaft 148 through the worm 153 and the gear 146, whereby the pinion 149 will be rotated and as it meshes with the gear segment 120, will cause the rearwardly extending portion of the yoke member to swing to the right or left relative to the main frame of the tractor whereby the tractor may be readily and easily steered through manipulation of the arm 160 which controls the spider 159. It is to be understood that when the arm 160 and the spider 159 controlled thereby are in neutral position, neither of the gears 155 or 156 will be forced into such close engagement with its corresponding clutch member as to cause rotative movement of the shaft 148 and the pinion 149 carried thereby. It will be readily understood that the clutch as set forth above comprises a ready and efficient means for steering the tractor through power derived from the main power system. Extending rearwardly from the shaft 145 and connected thereto by means of a universal joint 163 is a telescoping shaft 164 provided with a hand wheel 165 positioned within reach of the operator, whereby the tractor may be manually steered when desired.

The control devices for operating the various parts of the tractor mechanism are preferably supported by the yoke member, being positioned upon the rearward portion thereof where they are located within easy reach of the operator. In addition to the manual controlled mechanism 164 for steering the tractor, which is adapted to be operated by the hand wheel 165, means is provided for shifting the gears comprising a rod 166 which is operatively connected with a bell-crank lever 167 pivotally mounted upon the yoke, the bell crank lever 167 being connected with one end of the gear shifting shaft 87 by means of a link 167'. The rod 166 extends rearwardly and is pivotally connected to a hand lever 168 suitably positioned within reach of the operator. The rod 161 which controls the movement of the spider arm 160 extends rearwardly and is pivotally connected to a hand lever 169 suitably positioned within reach of the operator. The means provided for controlling the clutch mechanism comprises a rod 170 operatively connected with the clutch shifting arm and extending upwardly therefrom the opposite end of the rod 170 being connected by means of the universal joint 171 to an elbow lever 172 suitably supported by the upper arm of the yoke member. Connected to the opposite arm of the elbow lever by means of the joint 173 is a rearwardly extending rod 174 which is pivotally connected as at 175 to a combined hand and foot operated lever 176 which is suitably pivoted to the extreme rear portion of the rearwardly extending yoke member as at 177 where it is positioned in such a manner as to be easily accessible to the operator. Suitably mounted upon the extreme rear portion of the rearwardly extending yoke member is a bracket 178 which serves to provide a suitable support for the shaft 164, while a bracket 179 supports the hand levers 168 and 169 in proper position.

The mechanism for controlling the throttle valve comprises a suitable control rod 200 for co-operating with mechanism 201 to control the supply of fuel to the carburetor. The rod 200 is rotatably mounted and is connected by a universal joint 202 to a rod 203 which is rotatably mounted in bearings 204 and 205 carried by the yoke member and provided with an actuating wheel 206 located within easy reach of the operator, whereby the supply of fuel to the engine may be readily controlled by rotation of the wheel 206.

The rearwardly extending portion of the yoke member is provided with a pair of downwardly extending brackets 180 and 181, positioned in longitudinal alignment with each other and adapted to rotatably receive a shaft 182 to the rear end portion of which is secured a downwardly extending bracket 183 adapted to be pivotally secured to the implement which is to be drawn by the tractor. A bracket 184 carried by the shaft 182 is so constructed as to rotatably receive an axle 185 having downwardly extending end portion 186 by which trailer wheels 187 are carried. The trailer wheels 187 are capable of vertical adjustment by means of a suitable hand operated lever 188.

The means for exerting draft upon the trailing implement comprises a downwardly extending bracket 190 pivotally secured to the yoke at a suitable point as at 191 and forwardly connected to the main frame of the tractor by means of pull rods 192 which extend from the bracket 190 and are secured to the forward end portion of the lower arm 126 at such points that the draft is effective substantially from the pivotal point of the yoke member. A hitch 193 is capable of attachment to the bracket 190 in a plurality of adjusted positions as indicated at 194, and this hitch is preferably connected to the forward end portion of the trailing implement by means of links 195 and 196.

It will be seen from the above description that applicant has provided a structure of the balanced or unstable type, wherein the entire main frame portion is mainly supported by the oppositely positioned ground engaging wheels, and the transmission casing is so constructed as to provide suitable means for securing the engine casing to the front end portion thereof so that the same will be operatively connected with the transmission shaft, the engine shaft and the transmission shaft being located in substantial alignment with each other. The combined differential and transmission mechanism is operatively supported by means of a supplemental casing to permit the combined transmission and differential mechanism to be bodily removed from and replaced within the transmission casing as a unit, and the casing is constructed so as to provide a three-point suspension for the combined differential and transmission mechanism for retaining the same in operative position with respect to the engine shaft. The arrangement of the parts is such as to permit a ready removal of the combined differential and transmission mechanism upon removal of the cover plate without interference with the steering segment supported by the rear end portion of the main frame. The combined differential and transmission mechanism as carried by its supplemental casing is arranged in an extremely compact and serviceable manner, and is capable of being positioned within and removed from the casing with great readiness and with the detachment of a comparatively small number of parts. Notwithstanding the fact that the combined differential and transmission mechanism is capable of being readily and easily removed from and replaced within the casing, it is capable of being securely held in operative position therein when positioned within the casing and is of such compact arrangement as to be extremely efficient in operation. It will be observed upon reference to Figure VII of the drawings, that a simple and efficient means is provided for imparting rotative movement to the supplemental drum whereby the tractor may be readily utilized for the usual and ordinary farm purposes of operating stationary machinery. It will also be noted that the drum may be readily operated without transmitting movement to any considerable portion of the remaining mechanism, thereby resulting in providing a particularly efficient power mechanism when employed for the purpose of operating stationary machinery. The provision of means for raising and lowering the main frame portion relative to the land wheel of the tractor serves to permit the proper adjustment of the same to adapt the tractor for use in plowing, and for work upon side hills. The position of power operated steering mechanism wherein power for operating the same may be readily supplied from the transmission mechanism to enable the same to be operated at all times provides a novel and efficient form of power steering mechanism capable of being compactly arranged so as to permit its operation at all times and place the same under ready control of the operator. It is to be particularly observed that the manner of pivotally connecting the yoke member to the frame is such as to eliminate to the greatest possible extent the effects of the draft forces operating between the main frame of the tractor and the trailing implement, while the parts are so pivotally connected together as to enable the device to be properly steered at all times. By connecting the draft devices in such a manner as to result in the pull being exerted from the point of pivotal connection of the yoke member to the main frame, a straight pull is insured from the central point of the main frame at all times, and the position of the mating lugs upon the lower casting to which the lower arm of the yoke member is pivoted results in the draft being suitably communicated to the main frame of the tractor and prevents the possibility of injury to the casting to which the lower arm is pivoted.

While the embodiment of the invention illustrated herewith is shown and described in considerable detail, it is to be understood that this showing and description is illustrative only and for the purpose of rendering the invention more clear, and that it is not my purpose to limit the invention to the preferred details of construction illustrated or described except in so far as such limitations are included within the terms of the following claims, in which it is my intention to claim all novelty inherent in my invention broadly as well as specifically.

What I claim as new and desire to secure by Letters Patent is:

1. In a machine of the class described, an engine casing having a flared circular opening, a transmission casing having a circular end portion for connection with said opening, said end portion having integral pads at its upper part forming a radiator support and a radiator seated on said pads.

2. In a machine of the character described, a transmission casing provided with an opening extending therethrough, an engine detachably secured to one end of the transmission casing in such a manner that the engine shaft is in alignment with the opening in opposite ends of the transmission casing, and a cap plate detachably secured to the opposite end of the transmission casing for closing the opening in that end of the casing.

3. In a structure of the character described, a transmission casing provided with an opening extending therethrough, an engine detachably secured to one end of the transmission casing in such a manner as to provide a closure for the opening in one end of the transmission casing, and a plate detachably secured to the opposite end of the transmission casing for closing the opening in that end of the transmission casing.

4. In a structure of the character described, a transmission casing, an engine detachably secured to the casing and supported thereby, and transmission mechanism carried by the casing and bodily removable through the end opposite said engine.

5. In a structure of the character described, a pair of oppositely positioned supporting wheels, a casing located between the supporting wheels and provided with openings at opposite ends thereof, an engine supported by the casing adjacent one end thereof, a transmission unit carried by the casing and bodily removable therefrom, and a plate detachably secured to the end of the casing opposite to that to which the engine is attached and serving as a closure for the opening therein.

6. In a motor vehicle, a casing provided with openings at opposite ends thereof, an engine detachably secured to one end of the casing, and a unitary transmission mechanism carried by the casing and bodily removable through the opposite end thereof.

7. In a motor vehicle, a casing provided with openings at opposite ends thereof, an engine detachably secured to one end of the casing, a unitary transmission mechanism positioned within the casing and bodily removable through the opposite end thereof; and a removable plate secured to the last-named end of the casing and serving as a closure for the opening therein.

8. In a motor vehicle, a pair of supporting wheels each of which is provided with a gear carried thereon, a casing, transmission mechanism located within the casing and bodily removable therefrom, and a pair of aligned shafts extending in opposite directions from the casing, each of said shafts being provided with a pinion adapted to mesh with the gear carried by one of the supporting wheels and means permitting the withdrawal of said shafts outwardly.

9. In a motor vehicle, a pair of supporting wheels each of which is provided with a gear, a casing, unitary transmission mechanism carried by the casing, a pair of aligned shafts extending in opposite directions from the casing and each provided with a pinion meshing with the gear carried by one of the supporting wheels and means permitting the withdrawal of said shafts outwardly.

10. In a motor vehicle, a casing, having an opening in one end thereof, an engine secured to the open end of the casing and provided with a power shaft, transmission mechanism, a supplemental casing enclosing the transmission mechanism and means for removably retaining the supplemental casing within the first named casing in co-operative position relative to the engine shaft.

11. In a motor vehicle, a casing provided with openings in opposite ends thereof, an engine secured to one end of the casing and having a power shaft, transmission mechanism, a supplemental casing enclosing the transmission mechanism, means for removably securing the supplemental casing within the first named casing and in alignment with the power shaft, said supplemental casing being arranged to be withdrawn in a direction away from the engine and a cover plate removably secured to the opposite end of the first named casing.

12. In a motor vehicle, an outer casing, a transmission mechanism, a supplemental casing for said transmission mechanism adapted to be bodily inserted with said transmission mechanism within said outer casing, said supplemental casing having a portion adapted to interengage with a portion of said outer casing and a track formed on said outer casing for guiding said supplemental casing into said outer casing.

13. In a motor vehicle, a casing provided with a track comprising a pair of upstanding ribs, transmission mechanism adapted to be positioned within the casing and bodily removable therefrom, and a supplemental casing enclosing the transmission mechanism and slidable upon the track when the transmission mechanism is inserted within or removed from the first named casing.

14. In a motor vehicle, an open ended casing, an engine secured to the casing adjacent the open end thereof and provided with a power shaft extending into said casing, a combined transmission and differential unit insertable within and removable from the casing, and means for securing said unit within the casing in operative relation to the engine shaft.

15. In a motor vehicle, a casing, an engine detachably secured to and supported by one end of the casing, and a combined transmission and differential unit carried by the casing and removable through the opposite end thereof.

16. In a structure of the character described, a main frame including a transmission casing, a steering segment carried by the main frame, a transmission mechanism carried by the casing and removable therefrom in a rearward direction, the space between the casing and steering segment being sufficient to permit the removal of the transmission mechanism without removal of the steering segment.

17. In a structure of the character described, a main frame including transmission casing open at the rear end, a unitary transmission mechanism removable through said open end, a steering segment secured to the main frame, and a cover plate secured to the open end of the transmission casing adjacent to said steering segment.

18. In a structure of the character described, a unitary transmission and differential mechanism including a casing, a transmission shaft, a countershaft carried by the casing and located substantially parallel with the transmission shaft, a vertical shaft adjacent the countershaft, and means for operating the vertical shaft from the countershaft all of said mechanism except the vertical shaft being removable as a unit.

19. In a motor vehicle, a transmission unit comprising a worm, a mounting for said unit comprising a support into which a portion of the unit remote from said worm and worm wheel is adapted to be thrust, a worm wheel for said worm bearings for said worm wheel, and a pair of supports for said bearings, said last-named supports having demountable means for positively retaining the bearings therein.

20. In a motor vehicle, a transmission unit comprising a shaft adapted to rotate on an axis longitudinally of the vehicle and a gear adapted to rotate on a transverse axis, means for driving traction wheels from said gear, and a mounting for said unit comprising a support into which a portion of the unit concentric with said shaft and remote from said gear may be thrust, bearings for said gear, and a pair of supports for said bearings, said last-named supports having demountable means for positively retaining the bearings therein.

21. In a motor vehicle, a transmission unit comprising a shaft adapted to rotate on an axis longitudinally of the vehicle and a gear adapted to rotate on a transverse axis, means for driving traction wheels from said gear, and a mounting for said unit comprising a support into which a portion of the unit concentric with said shaft and remote from said gear may be thrust, bearings for said gear, and a pair of vertically divided supports for said bearings, the portions of the said divided supports remote from said first-named support being demountable.

22. In a device of the class described, a supplemental casing, transmission mechanism comprising an intermeshing worm a worm wheel, bearings in said casing for said worm and worm wheel, and demountable means for holding said worm wheel bearings in position in said casing.

23. In a machine of the class described, a body frame comprising a gear casing, gearing therein adapted to be withdrawn rearwardly from said casing, a pair of supporting wheels mounted upon opposite sides of said frame, a rearwardly extending member connected with said body frame for attachment to a device adapted to be drawn by said machine, said member being displaced from the rear of said gear casing to permit the withdrawal of said gearing.

24. In a machine of the class described, a body frame comprising a gear casing, an engine secured thereto, a pair of drive wheels mounted upon opposite sides thereof, gearing in said casing for operatively connecting said engine to said wheels and adapted to be bodily removed therefrom rearwardly, a rearwardly extending member, control mechanism for said machine carried thereby, said member being so connected to said body frame that a free space is provided at the rear of said gear casing.

25. In a machine of the class described, a body frame comprising a gear casing, an engine secured thereto, drive wheels mounted upon opposite sides thereof, gearing in said casing for operatively connecting said engine with said wheels and adapted to be bodily removed therefrom rearwardly, a rearwardly extending member having means at its rear end for connection with a device adapted to be drawn by said machine, and a yoke secured to said rearwardly extending member and pivotally connected to said body frame at one side of said gear casing whereby the gearing may be freely withdrawn from the casing.

26. In a machine of the class described, a body frame comprising a gear casing, an engine secured thereto, drive wheels mounted upon opposite sides of said frame, gearing in said casing operatively connecting said engine with said wheels, means to permit said gearing to be bodily removed from said casing, a rearwardly extending member adapted to be connected with a device to be drawn by said machine and means for connecting said member with said frame in a position out of alinement with the path of movement of said gearing when the same is withdrawn from its casing.

27. In a machine of the class described, a body frame comprising a gear casing, an engine secured to the forward end of said casing, a drive wheel mounted on each side of said frame, gearing in said gear casing and rearwardly removable therefrom, drive shafts connecting said gearing with said wheels, control mechanism for said machine, a rearwardly extending member carrying said control mechanism and adapted to be attached to a device to be drawn by said machine and a yoke pivoted to said casing on an axis at one side thereof whereby the gearing may be bodily withdrawn without interference.

28. In a motor vehicle, a gear casing having an open end and a track formed on a wall thereof, a combined differential and transmission unit comprising a supporting frame having a portion constructed to interengage with an interior part of said casing and a portion adapted to slide on said track whereby when said unit is inserted in said casing proper interengagement is effected.

29. In a device of the character described, a casing, a frame removably secured therein, a transmission mechanism and a differential mechanism secured by said frame in cooperative relation with each other and means for removing said differential mechanism as a unit from said frame.

In testimony whereof, I affix my signature.

EDWARD H. BELDEN.